Figure 1:
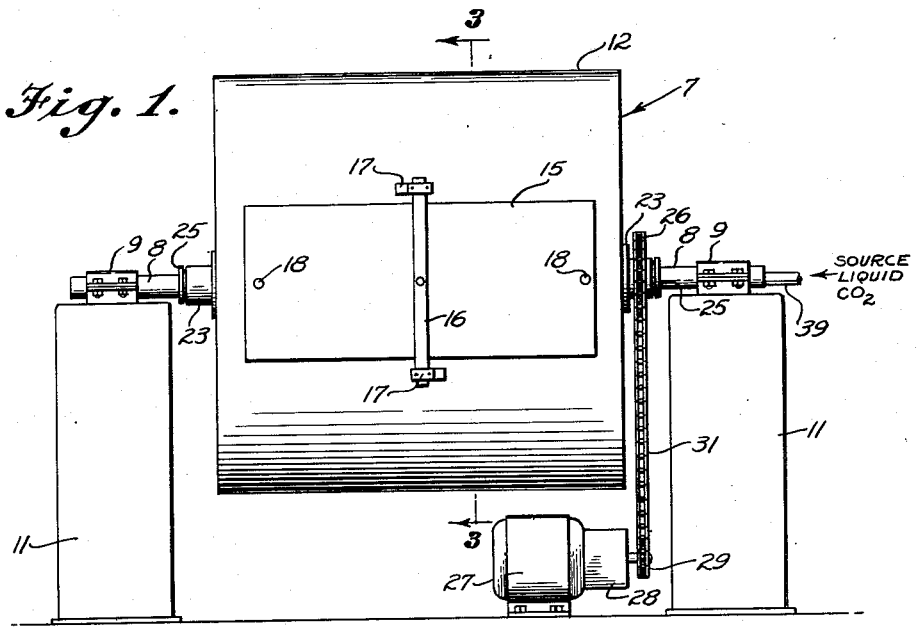

July 6, 1954  W. J. HANRAHAN ET AL  2,682,732
APPARATUS FOR REMOVING FINS FROM MOLDED PRODUCTS
Filed Jan. 18, 1952  2 Sheets-Sheet 1

INVENTORS
Walter J. Hanrahan and
Walter H. Oliver
BY
ATTORNEY

July 6, 1954 W. J. HANRAHAN ET AL 2,682,732
APPARATUS FOR REMOVING FINS FROM MOLDED PRODUCTS
Filed Jan. 18, 1952 2 Sheets-Sheet 2
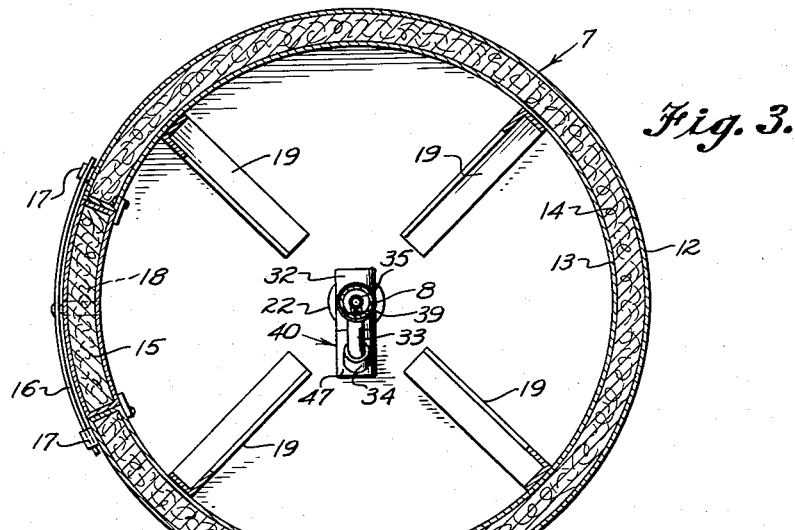
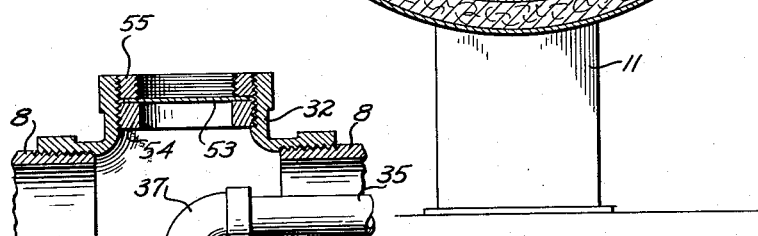
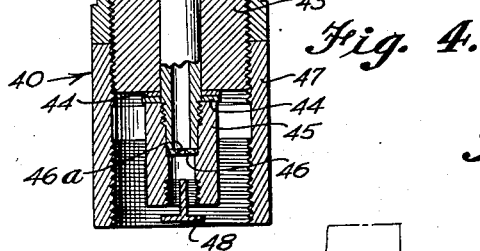
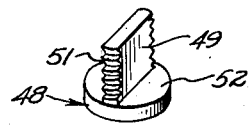
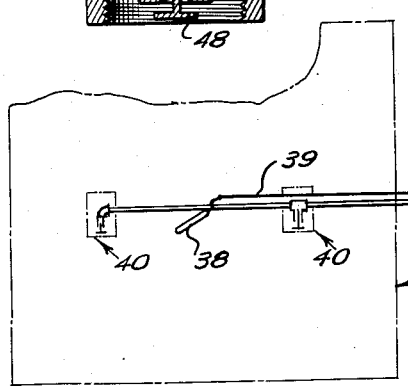
INVENTORS
Walter J. Hanrahan and
Walter H. Oliver
BY
ATTORNEY Patented July 6, 1954

2,682,732

UNITED STATES PATENT OFFICE 2,682,732

APPARATUS FOR REMOVING FINS FROM MOLDED PRODUCTS

Walter J. Hanrahan and Walter H. Oliver, San Diego, Calif., assignors to Cardox Corporation, Chicago, Ill., a corporation of Illinois Application January 18, 1952, Serial No. 267,033

4 Claims. (Cl. 51—164)

1

This invention relates to new and useful improvements in a method of and apparatus for removing the fins from molded products, and deals more specifically with the removal of fins from molded rubber products while tumbling the latter at low temperatures.

The practice of removing fins from molded rubber products by tumbling the products in refrigerated drums is well known and widely used in industry. Further, it is common practice to employ carbon dioxide as the refrigerant in such operations. However, the methods used theretofore have not been entirely satisfactory because, in practicing them, it has been impossible to properly control the temperatures that are created in the drums during tumbling operations and to maintain the temperature substantially uniform throughout the entire interior of the drum so that all of the products will be uniformly exposed to a temperature at which the flash rubber will become sufficiently brittle to break off while the main bodies of the products will remain sufficiently elastic to prevent damage thereto during the tumbling operation.

In view of the above, it will be apparent that the primary considerations in an operation of this type are the uniform cooling of all of the products in the tumbling drum to the same low temperature and the tumbling of the products for a period of time during which the relatively thin fins will become brittle at the given low temperature while the heavier body portions of the products remain elastic. In other words, at a given low temperature various portions of the products will become successively brittle and will be subject to breakage depending upon the thickness and exposed surface areas of the particular portions. The thin exposed fins will become brittle sometime before any of the heavier body portions of the products, and the tumbling must be discontinued in advance of the time at which the lightest body portion will become brittle and be subject to breakage. Obviously, any substantial variation in the cooling effects to which different portions of the mass of products is exposed will result in incomplete removal of the fins or breakage of some of the products.

Inasmuch as the permissible tumbling period is dependent to a great extent upon the differences in thickness and exposed surface areas of the fins and the lightest body portion of a given product, the removal of fins from a relatively thin or fragile product is most efficiently carried out by rapidly cooling the product under very closely controlled conditions and tumbling

2 the cooled product for a short period of time. When removing the fins from a relatively thick or solid product, the cooling requirements are not as critical but it is desirable to control the minimum temperature by a controlled introduction of the refrigerant to prevent unnecessary cooling of the drum and the resulting waste of refrigerant. It will be apparent, therefore, that the most efficient operation for the removal of fins from the wide variety of products which are molded from rubber and similar materials requires the use of a refrigerating medium which will rapidly cool the products to the desired temperature and which may be closely controlled to maintain the temperature of the products at the desired value.

The primary object of this invention is the provision of a novel method and apparatus for rapidly and uniformly cooling and maintaining at the desired low temperature a mass of molded products while the latter are being tumbled in a rotating drum.

A further important object of the invention is to provide a refrigerated tumbling device for molded rubber, and like products, which will uniformly subject all of the products being treated to the low temperature at which only the thin flash rubber will become brittle and be broken off during the period of the tumbling operation.

A further object of the invention is to provide a refrigerated tumbling device which automatically will be maintained at the low temperature that is necessary to effect the removal of flash rubber from the molded products being treated during the tumbling period.

A still further object of the invention is to provide tumbling apparatus, for removing flash rubber from molded products, which is refrigerated by suddenly expanding liquid carbon dioxide into the apparatus so as to uniformly subject the entire surface area of each product to the refrigerating action of a turbulent mixture of carbon dioxide snow and vapor.

A further object of the invention is to provide a method for removing the fins from molded products by tumbling the products in the presence of a turbulent mixture of finely divided carbon dioxide snow and low temperature vapor.

Still another object of the invention is to provide a method for removing the fins from molded products by tumbling the products in an environment which is automatically maintained at a substantially constant low temperature.

Other objects and advantages of the invention will be apparent during the course of the following description.

Figure 2:
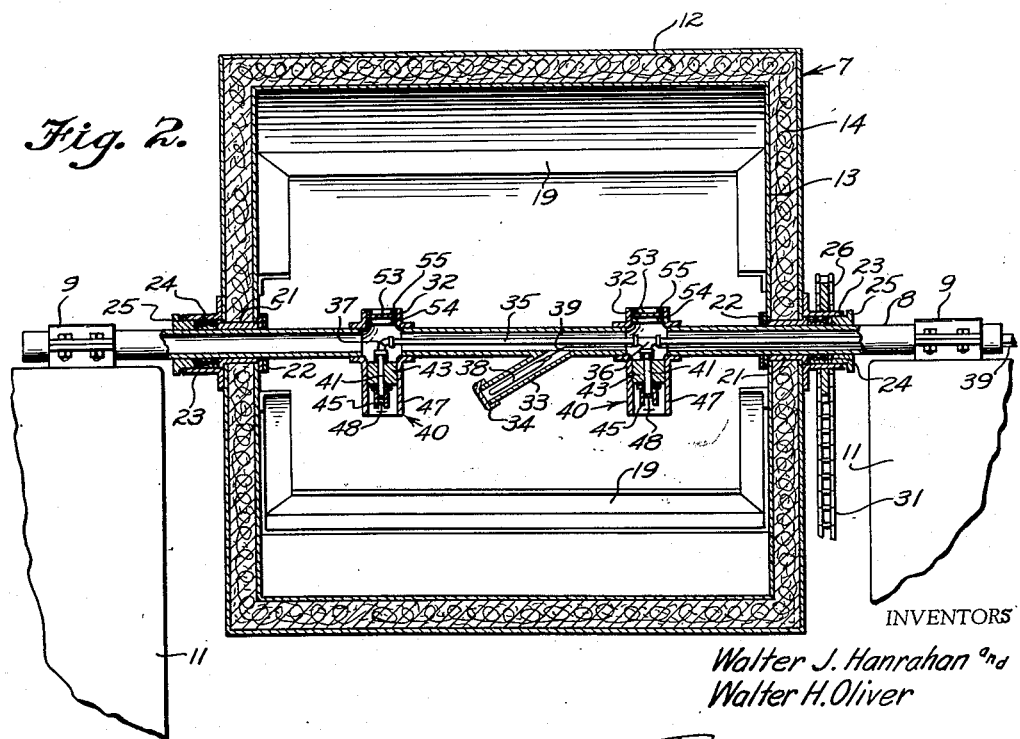

In the accompanying drawings forming a part of this specification and in which like numerals are employed to designate like parts throughout the same, Figure 1 is a side elevational view of tumbling apparatus embodying the invention, Figure 2 is a longitudinal sectional view of the tumbling drum illustrated in Fig. 1, Figure 3 is a transverse sectional view taken on line 3—3 of Fig. 1, Figure 4 is a detail sectional view of one of the carbon dioxide discharge devices illustrated in Fig. 2, Figure 5 is a detail perspective view of the baffle used in the discharge device illustrated in Fig. 4, and Figure 6 is a diagrammatic view of the refrigerating system for the tumbling apparatus of Fig. 1.

In the drawings, wherein for the purpose of illustration is shown a preferred embodiment of this invention, and first particularly referring to Figs. 1 to 3, inclusive, reference character 7 designates a tumbling drum mounted for rotation about its horizontal axis on the stationary shaft 8. This shaft is of hollow construction and is supported at its opposite end portions by split clamps 9 which rest upon and are rigidly connected to the pedestals 11, or other suitable supports.

The tumbling drum 7 is formed with an outer cylindrical wall 12 and an inner cylindrical wall 13 with a space therebetween for receiving insulating material 14. Positioned in one peripheral wall of the drum 7 and extending longitudinally thereof is an access door 15 having a latch bar 16 pivotally connected thereto for engagement with the keepers 17 to hold the door in its closed position during rotation of the drum. The opposite end portions of the door 15 have vapor vent holes 18 formed therein. Mounted at circumferentially spaced intervals on the inner wall 13 of the drum 7 and projecting inwardly therefrom are agitator blades 19.

Axially located in the end walls of the drum 7 are sleeves 21 which extend through and are connected to the walls in surrounding relationship with the shaft 8. The inner end of each sleeve 21 is provided with a pair of gaskets 22 for sealing between the inner wall 13 of the drum and the shaft. Mounted on each end of the drum 7 is a cylindrical bearing housing 23 which projects axially and surrounds the shaft 8. Positioned in the spaces between the bearing housings 23 and the shaft 8 are antifriction bearings 24. Retaining sleeves 25 are fitted onto the stationary shaft 8 and provide additional seals between the drum 7 and the shaft.

The bearing housing 23 at one end of the drum 7 has rigidly mounted thereon a sprocket 26. A motor 27, having a speed reducing unit 28 connected thereto, is mounted beneath the drum 7 and is provided with a sprocket 29 in alinement with sprocket 26 for having trained thereover the drive chain 31.

That portion of the stationary shaft 8 which extends through the interior of the drum 7 has connected therein a pair of cross fittings 32 each of which is approximately centered in its respective one-half of the length of the drum. Approximately midway between the cross fittings 32, a branch pipe 33 is welded to the shaft 8 and extends angularly downwardly therefrom. The outer end of the pipe 33 is closed by cap 34 to form a chamber which is in communication with the bore of the shaft 8.

Extending into the bore of the shaft 8, from one end thereof, is a liquid carbon dioxide supply pipe 35 having a T fitting 36 connected therein in alinement with one of the cross fittings 32 and an elbow fitting 37 in alinement with the other cross fitting 32. A thermostatic bulb 38 is positioned in the chamber formed by the pipe 33 and cap 34 and is provided with a capillary tube 39 extending from the bulb through the interior of the shaft 8 and out of the end thereof through which the liquid carbon dioxide supply pipe 35 enters.

Reference now will be made to Figs. 2, 4 and 5, for a detail description of one of the two identical liquid carbon dioxide discharge devices 40 that are associated with the cross fittings 32 in the shaft 8 and are connected to the T fitting 36 and elbow fitting 37, respectively. Each discharge device 40 includes a short length of pipe 41 that is threadedly connected to one of the fittings 36 or 37 and extends downwardly therefrom through the lower opening in its cross fitting 32. Fitted over the pipe 41 are a spacing ring 42 and an externally threaded coupling plug 43, the latter being threaded into the lower opening of the cross fitting 32.

The lower end portion of the pipe 41 extends downwardly beyond the plug 43 and is externally threaded. A pair of sealing gaskets or washers 44 is fitted over the lower end portion of the pipe 41 and is forced into sealing engagement with the plug 43 by the coupling 45 threaded onto the end of the pipe 41. Held in place against the end of the pipe 41 by the reduced bore coupling 45 is an orifice plate 46 having a small central opening 46a. Threadedly connected to the lower end portion of the plug 43 is a sleeve which extends downwardly to a point slightly below the lower end of the coupling 45. Threaded in the lower end portion of the coupling 45, for adjustment relative thereto, is a baffle or deflecting plug 48 which is best illustrated in Fig. 5. This plug is formed with a flattened body portion 49, having threaded outer edges 51 for engaging the internal threads in the lower end of the coupling 45, and an integral deflecting disc 52 at its lower end.

A pressure relief or safety valve is provided in the upper opening of each cross fitting 32 by the shear disc 53, formed of lead or other suitable material, which is clamped in position between the two bushings 54 and 55.

Referring now to Fig. 6 for a detail description of the temperature control circuit and elements, the thermostatic bulb 38, through its capillary tube 39, is connected externally of the drum 7 to the bellows 56, which will be caused to expand and contract to operate the switch 57 in accordance with changes in temperature as later will be described. One terminal of the switch 57 is connected by the wire 58 and the manually operated switch 59 to one of the electric current supply lines. The other terminal of the switch 57 is connected through the wire 61 to one terminal of the solenoid valve 62 employed for controlling the flow of liquid carbon dioxide through the supply pipe 35. The other terminal of the solenoid valve 62 is connected by the wire 63 and the switch 59 to the second electric current supply line to complete the circuit through the switches 59 and 57 and the valve 62.

The operation of the tumbling drum 7 in removing fins from articles molded of rubber, plastic, or any other materials which are hardened by a reduction in temperature will be described as follows:

As a preliminary step to the tumbling operation, the proper tumbling time and temperature for the particular articles from which the fins are to be removed must be determined by experimentation or empirically. In general, however, it may be stated that articles having thin or delicate sections are normally cooled to a more exact temperature and tumbled for a shorter period than articles which are more massive and have no thin or delicate sections. Consideration also must be given to the material from which the article is molded, keeping in mind that the objective of the tumbling operation is to reduce the temperature of the thin flash portions to a value at which they will become brittle before the heavier body sections of the article become sufficiently brittle to break.

After the proper tumbling temperature has been determined for the particular articles to be treated, the automatic temperature responsive actuating mechanism for the switch 57 is adjusted so that when the temperature in the drum 7 is reduced to the proper value the switch 57 will be opened to de-energize and thereby close the solenoid valve 62 in the liquid carbon dioxide supply pipe 35.

The articles to be tumbled are introduced into the drum 7 through the opening for the access door 15 and the door then is replaced and secured in its closed position by the latch bar 16. The motor 27 is then energized to rotate the drum 7 and the switch 59 is closed to complete the electrical circuit through the valve 62 so that the valve is opened and liquid carbon dioxide is permitted to flow through the supply pipe 35 for discharge into the drum.

The temperature and vapor pressure of the liquid carbon dioxide flowing through the pipe 35 will vary according to the temperature and pressure at its source. Any storage temperature and its corresponding vapor pressure within the range of commercially available liquid carbon dioxide may, however, be used in the operation of the device. Of course, the lower the temperature at which the liquid carbon dioxide is stored, the higher the percentage of yield of snow in the discharge. For example, liquid carbon dioxide stored at 70° F. will consist of 29% snow when released at atmospheric pressure while liquid carbon dioxide stored at 0° F. produces 46% snow when released to the atmosphere. A suitable range of storage temperatures for the liquid carbon dioxide to provide a desirable high yield of snow, therefore, will extend from about —40° F. to about 32° F. For a practical commerical operation, the storage of liquid carbon dioxide at approximately 0° F. and its corresponding vapor pressure of about 305 pounds per square inch, absolute, has been found to be very satisfactory with respect to both temperature maintenance and snow yield.

The carbon dioxide flowing through the supply pipe 35 is discharged into the rotating drum 7 through the discharge devices 40 mounted in the cross fittings 32 at the end portions of the drum. Inasmuch as the discharge devices 40 are identical, the functioning of only one will be described.

As is best illustrated in Fig. 4, liquid carbon dioxide flowing through the pipe 35 will be directed downwardly through the pipe 41 for discharge through the small opening 46a in the orifice plate 46. The sudden reduction in the pressure of the liquid as it passes through the opening 46a will cause the liquid to flash and be converted to a mixture of carbon dioxide vapor and snow. It will be noted at this point that the pressure prevailing within the drum 7 will be maintained at substantially atmospheric pressure by venting of the excess gases from the drum through the vents 18 in the door 15. As a further precaution against the building up of excess pressure within the drum 7, the shear discs 53 in the upper openings of the cross fittings 32 are formed of a suitable material and thickness to cause at least one of the discs to be sheared by a pressure in excess of approximately 5 pounds per square inch, gauge. This shearing of a disc 53 will permit venting of the drum through its cross fitting 32 and the bore of the shaft 8.

Inasmuch as the carbon dioxide vapor in the drum 7 is formed by the release of liquid carbon dioxide to atmospheric pressure, the initial temperature of the vapor will be approximately —110° F. and the velocity of the vapor will create a turbulent mixture of vapor and snow which will provide a substantial and well distributed cooling medium for the articles in the drum. Additionally, the discharged mixture of carbon dioxide vapor and snow will strike the disc 52 of the deflector plug 48 to distribute the discharge stream more uniformly over the mass of tumbling articles in the drum 7. In this manner, the articles are quickly and uniformly cooled to the desired low temperature at which time the contraction of the fluid in the thermostatic bulb 38, the tube 39, and the bellows 56 will result in opening of the switch 57 and, in turn, closing of the valve 62. If, however, the temperature in the drum 7 rises above the desired low value during the tumbling period, its effect on the thermostatic bulb 38 will effect closing of the switch 57 to reopen the valve 62. The temperature in the drum 7 may, therefore, be maintained at the desired low value with a minimum discharge of liquid carbon dioxide.

The controlled discharge of liquid carbon dioxide into the tumbling drum 7 during the tumbling operation makes possible the maintenance of the temperature in the drum at its optimum point for proper removal of the fins from the molded articles. The thermostatic control also serves to minimize the amount of liquid carbon dioxide used for effecting the introduction of only a sufficient quantity of carbon dioxide to maintain the desired temperature during the tumbling operation so that no excess snow will remain when the operation is completed.

Utilization of the cooling effect of the carbon dioxide vapor formed by the discharge of the liquid carbon dioxide and the uniform distribution of the carbon dioxide snow as well as the thermostatic control discussed above greatly increases the efficiency of the tumbling operation over prior operations of this type. For example, one tumbling drum embodying this invention has been employed to replace three drums of a type in which particles of solid carbon dioxide are introduced into the drum with the articles to be tumbled. Further the work accomplished by the method embodying this invention requires approximately one-half the operating time formerly required by the three drums which were replaced. It is of additional importance to note that the drum embodying this invention, by rapidly and uniformly cooling the articles being tumbled, makes possible the treatment of delicate and thin articles which could not be successfully tumbled heretofore.

It is to be understood that the form of this invention herewith shown and described is to be taken as a preferred example of the same, and that various changes in the shape, size and arrangement of parts may be resorted to without departing from the spirit of the invention or the scope of the subjoined claims.

Having thus described the invention, we claim:

1. A device of the type defined, comprising an insulated cylindrical drum mounted for rotation about its horizontal axis, a prime mover drivingly connected to said drum for rotating the latter, an access door in said drum a normally open vent for releasing excess pressure from said drum, a safety vent, a closure for said safety vent rupturable by the increase in pressure in said drum to release such pressure, a carbon dioxide supply pipe entering axially into said drum and having a discharge device opening into the drum, a valve for controlling flow through said pipe, and temperature responsive valve operating means for opening and closing said valve.

2. A device of the type defined, comprising an insulated cylindrical drum mounted for rotation about its horizontal axis, an access door in said drum, a refrigerant supply pipe entering axially into said drum and having a discharge opening in the drum and directed radially toward the wall of the drum, a deflector plate mounted below the discharge opening, a valve for controlling flow through said pipe, and temperature responsive valve operating means for opening and closing said valve.

3. A device of the type defined, comprising an insulated cylindrical drum, an access door in said drum, a stationary shaft extending axially through the end walls of said drum and supporting the drum for rotary movement, said shaft having an axial passageway therein with a plurality of radially directed ports opening into said drum, a prime mover for rotating the drum, a pipe extending through the passageway in said shaft and having a discharge nozzle positioned in each radial port communicating with said pipe, a valve for controlling flow through said pipe, a valve operating device for opening and closing said valve, and temperature responsive control means for energizing and de-energizing said valve operating means.

4. A device of the type defined, comprising an insulated cylindrical drum having an access door and venting openings, a stationary shaft extending axially through the end walls of said drum and supporting the drum for rotary movement, said shaft having an axial passageway therein with a plurality of radially directed ports opening into said drum, a prime mover for rotating the drum, a pipe extending through the passageway in said shaft and having a discharge nozzle positioned in each one of said radial ports, a deflecting plate mounted in alinement with each discharge nozzle, an electrically operated valve for controlling flow through said pipe, and a thermostatic control operatively connected to said valve for effecting the opening and closing of the valve.

References Cited in the file of this patent

UNITED STATES PATENTS

| Number | Name | Date |
|---|---|---|
| 2,509,041 | Lubenow | May 23, 1950 |
| 2,533,653 | Winkeljohn | Dec. 12, 1950 |